(12) United States Patent
Kolar et al.

(10) Patent No.: US 11,903,523 B2
(45) Date of Patent: Feb. 20, 2024

(54) FOOD PROCESSOR ASSEMBLY

(71) Applicant: Vita-Mix Management Corporation, Olmsted Township, OH (US)

(72) Inventors: David Kolar, Stow, OH (US); Rebecca Hammond, Cleveland, OH (US); Fred Mehlman, Olmstead Township, OH (US); Phonesacksith G. Kettavong, Olmsted Township, OH (US)

(73) Assignee: Vita-Mix Management Corporation, Olmsted Township, OH (US)

( * ) Notice: Subject to any disclaimer, the term of this patent is extended or adjusted under 35 U.S.C. 154(b) by 866 days.

(21) Appl. No.: 16/936,287

(22) Filed: Jul. 22, 2020

(65) Prior Publication Data

US 2021/0022554 A1    Jan. 28, 2021

Related U.S. Application Data

(60) Provisional application No. 62/877,057, filed on Jul. 22, 2019.

(51) Int. Cl.
*A47J 43/046* (2006.01)
*A47J 43/07* (2006.01)

(52) U.S. Cl.
CPC ......... *A47J 43/046* (2013.01); *A47J 43/0716* (2013.01); *A47J 43/0727* (2013.01); *A47J 43/0794* (2013.01)

(58) Field of Classification Search
CPC .. A47J 43/046; A47J 43/0716; A47J 43/0727; A47J 43/0794

USPC .................................................. 99/485, 492
See application file for complete search history.

(56) References Cited

U.S. PATENT DOCUMENTS

| | | |
|---|---|---|
| 2,372,862 A | 4/1945 | Strauss et al. |
| 3,175,594 A | 3/1965 | Jepson |
| D227,535 S | 7/1973 | Grimes |
| 4,561,782 A | 12/1985 | Jacobsen et al. |
| 4,655,373 A | 4/1987 | Essen |
| 4,664,530 A | 5/1987 | Kurome et al. |
| D295,012 S | 4/1988 | Gelber |
| 4,812,623 A | 3/1989 | Haden |
| 4,822,175 A | 4/1989 | Barnard et al. |
| 4,840,239 A | 6/1989 | Slagg |

(Continued)

FOREIGN PATENT DOCUMENTS

| | | |
|---|---|---|
| CH | 172686 | 10/1934 |
| EP | 0963726 | 12/1999 |

(Continued)

OTHER PUBLICATIONS

"French Digital Kitchen", http://digitalinstitute.ncl.ac.uk/ilablearnkitchen/, retrieved Feb. 20, 2014, 4 pages.

(Continued)

*Primary Examiner* — Omar Flores Sanchez
(74) *Attorney, Agent, or Firm* — Dinsmore & Shohl LLP

(57) ABSTRACT

A food processor assembly is provided with a bowl base adapted to receive a rotary input, and an interlock. A bowl is separate from, and sized to be supported upon, the bowl base, to receive and process food products therein. A lid is sized to attach to the bowl to enclose the bowl and to interact with the bowl base interlock. The interlock of the bowl base is isolated from the bowl and the lid.

12 Claims, 2 Drawing Sheets

(56) References Cited

U.S. PATENT DOCUMENTS

| | | |
|---|---|---|
| 4,891,966 A | 1/1990 | Kramer |
| D305,973 S | 2/1990 | Barnard et al. |
| D309,077 S | 7/1990 | Pomroy |
| D309,399 S | 7/1990 | Barnard et al. |
| 4,942,781 A | 7/1990 | Hori |
| D321,647 S | 11/1991 | Oldorf |
| D336,590 S | 6/1993 | Barnard |
| 5,273,358 A | 12/1993 | Byrne |
| 5,275,307 A | 1/1994 | Freese |
| D345,488 S | 3/1994 | Barnard et al. |
| 5,323,973 A | 6/1994 | Ferrara, Jr. |
| 5,405,096 A | 4/1995 | Seol |
| D366,418 S | 1/1996 | Lown et al. |
| 5,533,797 A | 7/1996 | Gelber |
| 5,544,684 A | 8/1996 | Robinette |
| D374,590 S | 10/1996 | Ahern, Jr. |
| 5,678,718 A | 10/1997 | Morris et al. |
| 5,696,358 A | 12/1997 | Pfordresher |
| 5,803,598 A | 9/1998 | Harry et al. |
| 5,901,906 A | 5/1999 | Bouldin |
| D412,809 S | 8/1999 | Toro et al. |
| 5,934,181 A | 8/1999 | Adamczewski |
| 5,957,333 A | 9/1999 | Losenno et al. |
| 5,957,577 A | 9/1999 | Dickson et al. |
| 5,962,060 A | 10/1999 | Farrell |
| 6,059,445 A | 5/2000 | St. John et al. |
| D429,956 S | 8/2000 | Bohannon, Jr. et al. |
| 6,102,246 A | 8/2000 | Goulet et al. |
| D419,369 S | 10/2000 | Naft et al. |
| D432,204 S | 10/2000 | Brady |
| D432,864 S | 10/2000 | Kindig et al. |
| D435,192 S | 12/2000 | Bohannon, Jr. et al. |
| D437,731 S | 6/2001 | Thackray |
| 6,251,040 B1 | 6/2001 | Safont |
| D452,296 S | 12/2001 | Egnell et al. |
| 6,412,398 B1 | 7/2002 | Norcross |
| 6,431,744 B1 | 8/2002 | Ash et al. |
| 6,531,967 B2 | 3/2003 | Djorup |
| D480,915 S | 10/2003 | Kolar et al. |
| D481,258 S | 10/2003 | Brady et al. |
| 6,690,128 B1 | 2/2004 | Cotton |
| 6,755,305 B2 | 6/2004 | Nance |
| D495,925 S | 9/2004 | Ulanski et al. |
| 6,793,096 B1 | 9/2004 | Seok |
| 6,837,148 B1 | 1/2005 | Deschenes |
| 6,854,876 B2 | 2/2005 | Dickson |
| D506,393 S | 6/2005 | Nottingham et al. |
| 6,978,221 B1 | 12/2005 | Rudy |
| 6,979,117 B2 | 12/2005 | Dickson, Jr. |
| 6,982,640 B2 | 1/2006 | Lindsay |
| D514,868 S | 2/2006 | Achenbach et al. |
| 7,063,456 B2 | 6/2006 | Miller et al. |
| D526,839 S | 8/2006 | Boozer et al. |
| D528,363 S | 9/2006 | Ulanski et al. |
| 7,267,478 B2 | 9/2007 | Miller et al. |
| D552,916 S | 10/2007 | Bodum |
| 7,292,146 B1 | 11/2007 | Nguyen |
| 7,341,209 B1 | 3/2008 | Ko |
| 7,350,963 B2 | 4/2008 | Williams et al. |
| 7,409,765 B2 | 8/2008 | So |
| D577,545 S | 9/2008 | Ulanski |
| D587,064 S | 2/2009 | Mark |
| D587,526 S | 3/2009 | Barnard et al. |
| D588,406 S | 3/2009 | Ulanski et al. |
| 7,523,302 B1 | 4/2009 | Brown |
| 7,566,186 B2 | 7/2009 | Katz |
| 7,620,568 B1 | 11/2009 | Parker-Malchak |
| 7,680,691 B2 | 3/2010 | Kimball |
| 7,685,933 B2 | 3/2010 | Fevbre |
| 7,686,240 B2 | 3/2010 | Pryor |
| D621,656 S | 8/2010 | Ulanski et al. |
| 7,871,195 B2 | 1/2011 | Larsen |
| D637,870 S | 5/2011 | Bock |
| D660,642 S | 5/2012 | Boozer |
| D662,359 S | 6/2012 | Boozer et al. |
| 8,200,548 B2 | 6/2012 | Wiedl |
| 8,226,021 B2 | 7/2012 | Wilson |
| 8,235,724 B2 | 8/2012 | Gilley |
| 8,330,057 B2 | 12/2012 | Sharawi |
| D678,727 S | 3/2013 | Kolar et al. |
| 8,506,437 B2 | 8/2013 | Cheung |
| 8,529,120 B2 | 9/2013 | Ulanski et al. |
| 8,555,922 B2 | 10/2013 | Migliore et al. |
| 8,636,516 B2 | 1/2014 | Batsikouras |
| 8,770,983 B2 | 7/2014 | Batsikouras |
| 8,814,011 B2 | 8/2014 | Ulanski et al. |
| 8,829,365 B1 | 9/2014 | Wallace |
| 8,920,019 B2 | 12/2014 | Kozlowski |
| 9,389,117 B2 | 7/2016 | Merea |
| 9,529,385 B2 | 12/2016 | Connor |
| 9,635,981 B2 | 5/2017 | Barnard |
| 9,645,007 B2 | 5/2017 | Wallace |
| D797,496 S | 9/2017 | Gee |
| D812,963 S | 3/2018 | Smith |
| D830,115 S | 10/2018 | Gee |
| D832,029 S | 10/2018 | Gee |
| D846,339 S | 4/2019 | Smith |
| D846,352 S | 4/2019 | Smith |
| 10,257,753 B2 | 4/2019 | Sirotkin |
| 10,413,131 B2 | 9/2019 | Kolar |
| D863,873 S | 10/2019 | Kettavong |
| 10,695,935 B2 | 6/2020 | Zakowski |
| 11,013,371 B2 | 5/2021 | Kolar |
| 11,266,270 B2 | 3/2022 | Hammond |
| 2002/0124017 A1 | 9/2002 | Mault |
| 2002/0141286 A1 | 10/2002 | Wulf |
| 2003/0042805 A1 | 3/2003 | Bates et al. |
| 2003/0159857 A1 | 8/2003 | Lin |
| 2003/0205148 A1 | 11/2003 | Rubin et al. |
| 2004/0118618 A1 | 6/2004 | Davidson |
| 2005/0145717 A1 | 7/2005 | Katz et al. |
| 2005/0152215 A1 | 7/2005 | Stuart et al. |
| 2006/0261066 A1 | 11/2006 | Boozer |
| 2007/0131723 A1 | 6/2007 | Anderson |
| 2007/0140048 A1 | 6/2007 | Ismail |
| 2007/0278122 A1 | 12/2007 | McCumber |
| 2007/0286016 A1 | 12/2007 | Sun |
| 2009/0009815 A1 | 1/2009 | Karasik |
| 2009/0095322 A1 | 4/2009 | Wakao et al. |
| 2009/0144081 A1 | 6/2009 | Harlan |
| 2009/0157752 A1 | 6/2009 | Gonzalez |
| 2009/0258331 A1 | 10/2009 | Do |
| 2009/0259687 A1 | 10/2009 | Do |
| 2009/0309704 A1 | 12/2009 | Chang |
| 2010/0000801 A1 | 1/2010 | Smith |
| 2010/0027373 A1 | 2/2010 | Barnard |
| 2010/0038149 A1 | 2/2010 | Corel |
| 2010/0089152 A1 | 4/2010 | Kolada |
| 2010/0125181 A1 | 5/2010 | Hyde |
| 2010/0199823 A1 | 8/2010 | Dalla Piazza |
| 2010/0212076 A1 | 8/2010 | Kihs |
| 2010/0229894 A1 | 9/2010 | Nagatani et al. |
| 2010/0240962 A1 | 9/2010 | Contant |
| 2011/0044370 A1 | 2/2011 | Schochet |
| 2011/0167100 A1 | 7/2011 | Brodowski |
| 2011/0213667 A1 | 9/2011 | Ierullo |
| 2012/0136864 A1 | 5/2012 | Ochtel |
| 2012/0167712 A1 | 7/2012 | Cheung |
| 2012/0179665 A1 | 7/2012 | Baarman |
| 2013/0171304 A1 | 7/2013 | Huntley |
| 2013/0209972 A1 | 8/2013 | Carter |
| 2013/0216982 A1 | 8/2013 | Bennett |
| 2013/0268111 A1 | 10/2013 | Dekar |
| 2014/0063180 A1 | 3/2014 | Sharma |
| 2014/0299687 A1 | 10/2014 | Rosenzweig |
| 2014/0318874 A1 | 10/2014 | Moses |
| 2014/0332289 A1 | 11/2014 | Gallagher |
| 2015/0037480 A1* | 2/2015 | Carlson ............... A47J 43/0794 241/36 |
| 2015/0260699 A1 | 9/2015 | Minvielle |
| 2015/0265983 A1 | 9/2015 | Fleming et al. |
| 2015/0305564 A1 | 10/2015 | Jimenez |
| 2016/0101533 A1 | 4/2016 | Aramburo |
| 2016/0213199 A1* | 7/2016 | Hensel ............... A47J 43/0772 |

(56) References Cited

U.S. PATENT DOCUMENTS

| | | | |
|---|---|---|---|
| 2016/0256005 A1 | 9/2016 | Dickson | |
| 2016/0256006 A1 | 9/2016 | Dickson | |
| 2016/0256007 A1 | 9/2016 | Dickson | |
| 2016/0256008 A1 | 9/2016 | Dickson | |
| 2016/0256839 A1 | 9/2016 | Dickson | |
| 2017/0105578 A1 | 4/2017 | Krebs | |
| 2017/0172347 A1 | 6/2017 | Potter | |
| 2017/0325621 A1 | 11/2017 | Herbert | |
| 2021/0022554 A1 | 1/2021 | Kolar | |
| 2021/0186267 A1* | 6/2021 | Hammond | A47J 43/0727 |

FOREIGN PATENT DOCUMENTS

| | | |
|---|---|---|
| EP | 2085005 | 8/2009 |
| FR | 2696087 | 4/1994 |
| GB | 699947 | 11/1953 |
| GB | 2251960 | 7/1992 |
| JP | 200510951 | 1/2005 |
| WO | WO8801199 | 2/1988 |
| WO | WO2002038456 | 5/2002 |
| WO | WO2009100868 | 8/2009 |
| WO | WO2011008234 | 1/2011 |
| WO | WO2016191538 | 12/2016 |

OTHER PUBLICATIONS

Cheng, Jacqui, "Cooking with the IPad: Which Apps Offer the Best Experience?" Ars Technica. Conde Nast, Aug. 7, 2012. Web. Mar. 3, 2016 <http://arstechnica.com/apple/2012/08/cooking-with-the-ipad-which-apps-offer-the-best-experience/> 8 pgs.

Comstock, Jonah, "Lift Labs raises $1M for tremor-canceling spoon",http://mobihealthnews.com/25502/lift-labs-raises-1 m-for-tremor-canceling-spoon/, Sep. 18, 2013, retrieved Feb. 20, 2014, 9 pages.

Discover RFID, http://www.discoverrfid.org/what-is-possible/get-what-you-want/perfectly-cooked-recipes.html, printed Nov. 11, 2013, 1 page.

Hooper, Clare, Clare Hooper's Blog, "More activity recognition", http://www.clarehooper.net/blog/2012/04/more-activity-recognition/, Apr. 17, 2012, retrieved Feb. 20, 2014, 5 pages.

My Recipe Book, "Typing Recipes into the App", Oct. 5, 2012, Retrieved on Apr. 9, 2013 from http://www.myrecipebookapp.com/?p=90, 2 pages.

Notice of Allowance issued in U.S. Appl. No. 13/909,011 dated Oct. 13, 2015; 10 pages.

Office Action issued in U.S. Appl. No. 13/909,011 dated Apr. 6, 2015; 14 pages.

Office Action issued in U.S. Appl. No. 14/185,857 dated Oct. 23, 2015; 22 pages.

Office Action issued in U.S. Appl. No. 14/280,144 dated Apr. 21, 2015, 20 pages.

Office Action issued in U.S. Appl. No. 14/280,144 dated Oct. 8, 2015; 18 pages.

Pham, Cuong et al., "The Ambient Kitchen: A Pervasive Sensing Environment for Situated Services", http://www.clarehooper.net/publications/2012/DIS2012demo.pdf, Jun. 11, 2012, retrieved Feb. 20, 2014, 2 pages.

RFID digital weighing scales with printer, http://www.alibaba.com/productgs/614113341/LED_displayer_RFID_digital_weighing_scales.html, retrieved May 16, 2014, 6 pages.

Roberti, Mark, "RFID's Role in Food Safety", RFID Journal, http://www.rfidjournal.com/articles/view?10864, Jul. 29, 2013, 1 page.

Seth, Radhika, "Tasty Tastings", http://www.yankodesign.com/2012/10/23/tasty-tastings/, Oct. 23, 2012, retrieved Feb. 20, 2014, 7 pages.

Smart Diet Scale Features, http://smartdietscale.com/how-it-works/; retrieved on Apr. 6, 2015; 7 pages.

Terso Solutions, "RFID Refrigerator", http://www.tersosolutions.com/rfid-refrigerators/, retrieved May 19, 2014, 1 page.

Trew, James "HAPILABS introduces HAPIfork (and spoon) smart utensils, brings metrics to your mouthfuls (hands-on)", http://www.engadget.com/2http://www .syncids. com/I DSgraphics/Blan kPage Icon. PNG013/01 /06/hapi labs-introduces-hapifork-andspoon-smart-utensils-brings/, Jan. 6, 2013, retrieved Feb. 20, 2014, 13 pages.

Turnage, Will, "Kitchen Scale App Prototype", http://www.youtube.com/watch?v=S5WNCv4cqfg, Apr. 22, 2012, Retrieved on Jun. 3, 2013, 3 pages.

U.S. Appl. No. 61/800,252, filed Mar. 15, 2013, 54 pages.

Watts, Tom, "Smart Diet Scale makes it easy to lose weight"; The Macomb Daily; Jan. 31, 2013, 2 pages; www.macombdaily.com.

Wax Sensor, http://europeandigitalkitchen.com/wp-content/uploads/2012/01 /Lancook-Utensils- Brochure.pdf, retrieved Feb. 20, 2014, 8 pages.

Wikipedia, "Food Packaging", http://en.wikipedia.org/wiki/Food_packaging, retrieved May 16, 2014, 5 pages.

Translation of Martin et al. (Year: 2009) (Reference is to equivalent WO doc).

\* cited by examiner

FOOD PROCESSOR ASSEMBLY

CROSS-REFERENCE TO RELATED APPLICATIONS

This application claims the benefit of U.S. provisional application Ser. No. 62/877,057 filed Jul. 22, 2019, the disclosure of which is hereby incorporated in its entirety by reference herein.

SUMMARY

According to at least one embodiment, a food processor assembly is provided with a bowl base adapted to receive a rotary input, and an interlock. A bowl is separate from, and sized to be supported upon, the bowl base, to receive and process food products therein. A lid is sized to attach to the bowl to enclose the bowl and to interact with the bowl base interlock. The interlock of the bowl base is isolated from the bowl and the lid.

According to a further embodiment, the lid and the bowl collectively provide a food processing region that is free of grooves or crevasses.

According to a further embodiment, a plunger is provided on the lid. The plunger includes a lengthwise rod that interacts with a switch on the bowl base to indicate a position of the plunger.

According to at least one embodiment, a method for cleaning a food processor assembly encloses food product within a bowl and a lid of the food processor assembly. Food product is processed within the bowl and the lid. The bowl and the lid are each separated from a bowl base thereby disengaging from an interlock in the bowl base. The bowl and the lid are washed.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Most food processors on the market have processing bowls and/or lids which contain interlock components in order to pass compliance regulations of an interlocked lid/plunger opening. Many food processors simply try to minimize the amount of parts in the bowl in order to have the water/cleaning products flow through the interlock areas. Since the interlocks are mechanical mechanisms, they require parts to move in and out of the interlock area on the bowl and thus cannot be sealed.

Figure 1:
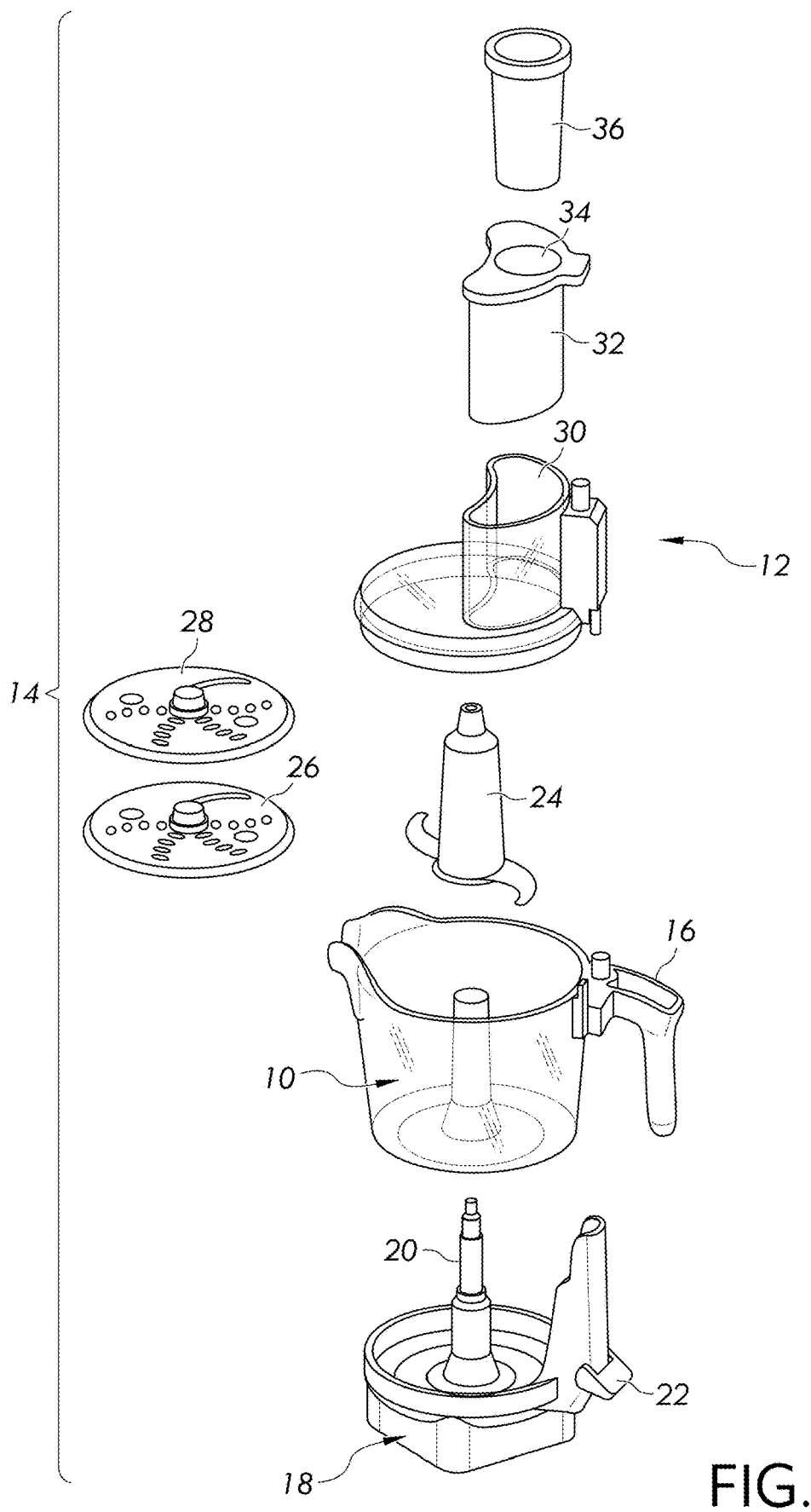
FIG. 1 is an exploded perspective view of a food processor assembly according to an embodiment.

An easily cleanable food processor bowl 10 and lid 12 of a food processor assembly 14 are provided in FIG. 1. The food processor assembly 14 allows the user to completely separate the bowl 10 from all the interlock components and a drive train gearbox. The single piece plastic bowl 10 allows the user to have a lighter weight bowl 10 for removing ingredients and cleaning than competitive products. Having a bowl 10 without interlock components makes it much easier to clean out ingredients—it also eliminates crevasses in the bowl 10 where food or bacteria can be caught. The bowl 10 becomes completely dishwasher save and submersible. An ergonomic handle 16 on the bowl 10 promotes the use of just the bowl 10 (without a base 18) when removing ingredients as opposed to using the bowl 10 and the base 18 together which can be heavy for the user. Having a completely separable bowl 10 also avoids any user requirement to submerge or dishwash any part of the processor assembly 14 containing the interlock components and drive train, which are both contained in the base 18. The food products do not contact the base 18 in ordinary use. The processor assembly 14 only requires the user to clean the bowl 10 and the lid 12 after use.

The base 18 includes a mechanical input (not shown) to receive a rotary input from a motorized base (not shown) according to an embodiment. The base 18 also includes an output shaft 20 that is driven by the rotary input. According to an embodiment, a transmission is provided in the base 18 to reduce the speed of rotation imparted upon the output shaft 20, and consequently, increase a torque output of the output shaft 20. The output shaft 20 extends into the bowl 10. The base 18 also includes a bowl release 22 for manual locking of the bowl 10 to the base 18, and for releasing the bowl 10 from the base 18.

A chopping blade 24 is provided to be installed upon the output shaft 20 within the bowl 10 to perform a chopping operation to a food product within the bowl 10. A pair of slicing/shredding discs 26, 28 are also provided to each be installed upon the output shaft 20 within the bowl 10 to perform varying slicing and shredding operations to the food product within the bowl 10. The chopping blade 24 and the slicing/shredding discs 26, 28 are interchangeable.

A chute 30 is provided on the lid 12 for receipt of food product into the chute 30, through the lid 12, and consequently into the bowl 10 for a chopping, slicing or shredding operation with the chopping blade 24 or one of the slicing/shredding discs 26, 28. A plunger 32 is sized to be received within the chute 30. The plunger 32 includes an aperture 34. A feed tube 36 is sized to be received within the aperture 34 to push food product through the aperture 34 in the plunger 32, and consequently, through the chute 30 in the lid 12.

Figure 2:
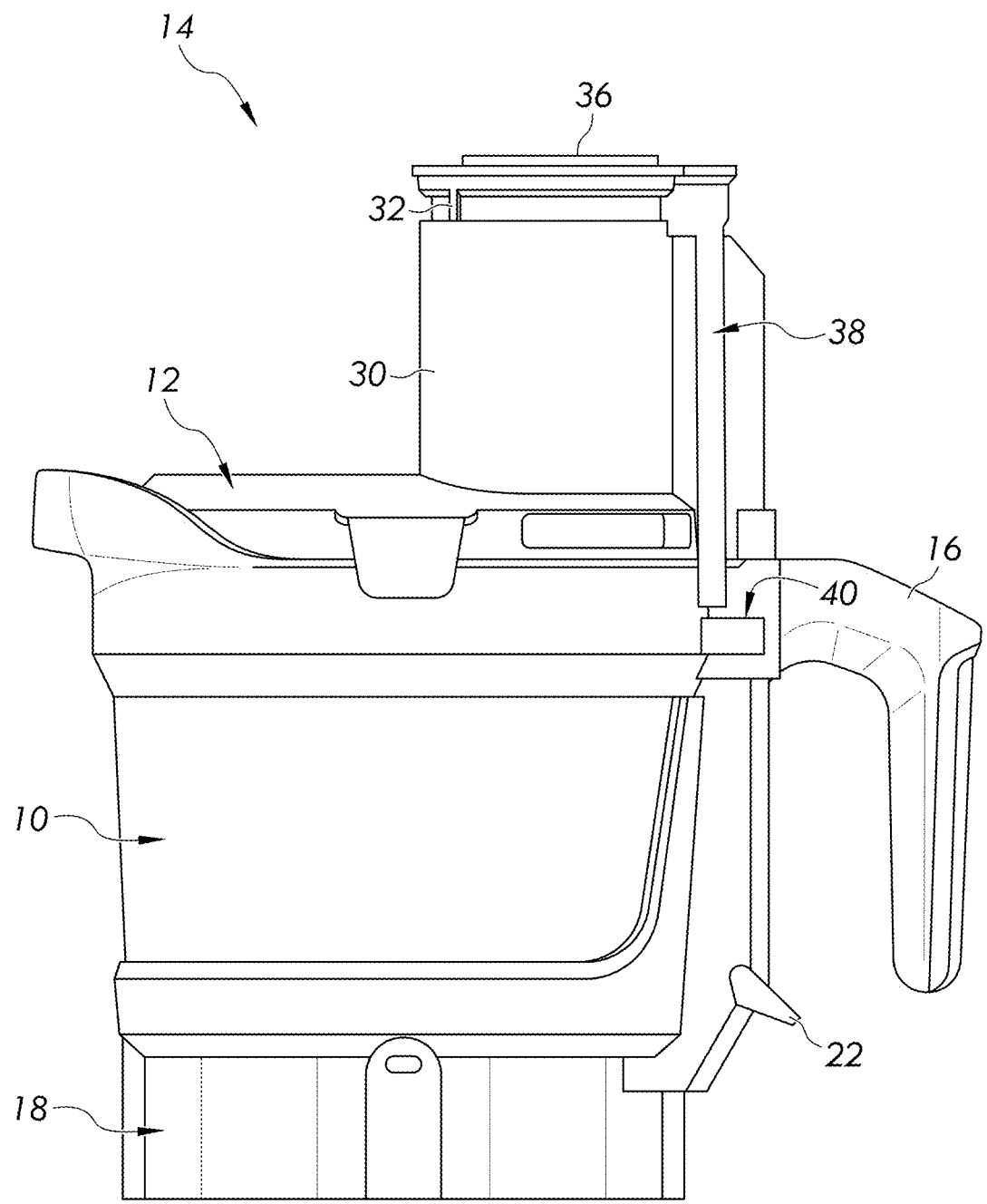
FIG. 2 is a side elevation view of the food processor assembly of FIG. 1.

Another embodiment of the food processor assembly 14 is depicted in FIG. 2 and includes the plunger 32 with a long rod 38 which eliminates the need for an interlock in the lid 12 hence making the lid 12 cleanable with no trapped spaces or mechanisms. The rod 38 of the plunger 32 passes through the lid 12 and activates an interlock button 40 in the base 18. This allows both the bowl 10 and lid 12 to not have any interlock components and the base 18 houses all of the interlock components, thereby making the lid 12 and bowl 10 completely easily cleanable. The long plunger rod 38 or pin presses the button 40 without any interlock mechanisms in the lid 12.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A food processor assembly, comprising:
   a bowl base adapted to receive a rotary input, the bowl base comprising an interlock;
   a bowl separate from, and sized to be supported upon, the bowl base, the bowl receiving and processing food products therein; and
   a lid sized to attach to the bowl to enclose the bowl and to interact with the interlock of the bowl base,
   wherein the interlock of the bowl base is isolated from the bowl and the lid.

2. The food processor assembly of claim 1, wherein the lid and the bowl collectively provide a food processing region that is free of grooves or crevasses.

3. The food processor assembly of claim 1, further comprising:
   a plunger disposed within the lid; and
   a lengthwise rod operatively coupling the plunger to a switch on the bowl base.

4. The food processor assembly of claim 1, wherein the bowl base further comprises an output shaft that is driven by the rotary input.

5. The food processor assembly of claim 1, wherein the bowl base is a motorized base further comprising a drive train gearbox.

6. The food processor assembly of claim 4, wherein the bowl base further comprises a transmission that is disposed in the bowl base that reduces a speed of rotation imparted on the output shaft by the rotary input.

7. The food processor assembly of claim 4, further comprising a removable chopping blade operatively coupled to the output shaft.

8. The food processor assembly of claim 4, further comprising one or more removable slicing discs operatively coupled to the output shaft.

9. The food processor assembly of claim 4, wherein the bowl is a single piece bowl further comprising an interior wall defining a cavity therethrough shaped and sized to permit the output shaft to extend into the bowl through the cavity without interlocking the bowl.

10. The food processor assembly of claim 1, wherein the bowl base further comprises a locking mechanism that releasably secures the bowl to the bowl base.

11. The food processor assembly of claim 1, wherein the bowl further comprises a handle that is free of any interlock components.

12. The food processor assembly of claim 3, wherein the plunger is disposed within a chute, the plunger further comprises:
   a barrier defining an aperture extending through the plunger; and
   a feed tube disposed within the aperture.

* * * * *